United States Patent [19]

Rokowski

[11] Patent Number: 5,535,664

[45] Date of Patent: Jul. 16, 1996

[54] REMOTE CONTROL COOKING APPARATUS WITH STACKABLE COOKERS

[76] Inventor: Paul Rokowski, 1524 Super Hwy., Langhorne, Pa. 19047

[21] Appl. No.: 546,698

[22] Filed: Oct. 23, 1995

[51] Int. Cl.⁶ .................................................. A47J 37/00
[52] U.S. Cl. ........................... 99/331; 99/337; 99/422; 99/448; 219/487; 219/506; 340/825.06; 340/825.17
[58] Field of Search ................ 99/324, 325, 331–333, 99/337, 338, 422, 423, 424, 448–450, 482, 339, 340, 357; 126/373, 374; 119/51.11; 219/448, 452, 453, 486, 487, 483, 501, 506, 714; 340/825.06, 825.07, 825.16, 825.17

[56] References Cited

U.S. PATENT DOCUMENTS

| | | | |
|---|---|---|---|
| 3,811,085 | 5/1974 | Saulsman | 219/132 |
| 4,064,796 | 12/1977 | Jones | 99/448 |
| 4,131,786 | 12/1978 | Cooper | 219/487 |
| 4,216,241 | 8/1980 | Thompson | 99/448 |
| 4,224,862 | 9/1980 | Liebermann | 99/331 |
| 4,786,799 | 11/1988 | Welle, Jr. et al. | 219/486 |
| 4,987,827 | 1/1991 | Marquez | 99/331 |
| 5,008,662 | 4/1991 | Tokizane et al. | 340/825.06 |
| 5,096,116 | 3/1992 | Akamatu et al. | 99/331 |
| 5,216,947 | 6/1993 | Cheng | 99/448 |
| 5,299,529 | 4/1994 | Ramirez | 119/51.11 |
| 5,320,030 | 6/1994 | Hubbard | 99/423 |
| 5,321,229 | 6/1994 | Holling et al. | 219/506 |

*Primary Examiner*—Timothy F. Simone

[57] ABSTRACT

A remote control cooking apparatus with stackable cookers including a base. The base has an outer wall, an inner wall and is supported by three support legs. Included is a heating element between the outer wall and the inner wall. An electrical conductor prong is provided. The electrical conductor prong is in communication with the heating element and has a top prong and a bottom prong. Also, included is a rheostat timer. The timer has and a female receptacle capable of coupling with the bottom prong of the electrical conductor prong of the base. A top cylindrical cooker is provided. The cooker has a side wall with an upper cooking plate therebetween. The top cooker has a top rheostat. A cover for placement over the top cooker is included. Lastly, three cylindrical cookers are provided. Each cooker has a side wall with a cooking plate and a rheostat with male prongs and a female receptacle, each of the three cookers are seated one on top of another and the base, with the top cooker seated thereon to form a stacked cooking apparatus.

9 Claims, 3 Drawing Sheets

REMOTE CONTROL COOKING APPARATUS WITH STACKABLE COOKERS

BACKGROUND OF THE INVENTION

1. Field of the Invention

The present invention relates to a remote control cooking apparatus with stackable cookers and more particularly pertains to cooking a variety of foods in the apparatus at a set temperature with the apparatus being activated by a signal transmitted through the users telephone to a receiver on the apparatus.

2. Description of the Prior Art

The use of remote control appliances is known in the prior art. More specifically, remote control appliances heretofore devised and utilized for the purpose of cooking are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,321,229 to Holling, Huenet and Manson discloses a remote control for a domestic appliance. U.S. Pat. No. 5,299,529, to Ramirez discloses an automatic feeder for dogs and other animals. U.S. Pat. No. 5,008,662 to Tokizane, Ito, Yamada, Masuda and Kuroda discloses a remote supervisory and controlling machine. U.S. Pat. No. 4,131,786 to Cooper discloses a remotely controllable electric oven. Lastly, U.S. Pat. No. 4,786,799 to Wells and Payne discloses a power control for cooking appliance with multiple heating units.

While these devices fulfill their respective, particular objectives and requirements, the aforementioned patents do not describe a remote control cooking apparatus with stackable cookers that allows a user to call home from any location at any time and have a signal transmitted to the receiver on the apparatus to initiate the cooking process.

In this respect, the remote control cooking apparatus with stackable cookers according to the present invention substantially departs from the conventional concepts and designs of the prior art, and in doing so provides an apparatus primarily developed for the purpose of cooking a variety of foods in the apparatus at a set temperature with the apparatus being activated by a signal transmitted through the users telephone to a receiver on the apparatus.

Therefore, it can be appreciated that there exists a continuing need for a new and improved remote control cooking apparatus with stackable cookers which can be used for cooking a variety of foods in the apparatus at a set temperature with the apparatus being activated by a signal transmitted through the users telephone to a receiver on the apparatus. In this regard, the present invention substantially fulfills this need.

SUMMARY OF THE INVENTION

In view of the foregoing disadvantages inherent in the known types of remote control appliances now present in the prior art, the present invention provides an improved remote control cooking apparatus with stackable cookers. As such, the general purpose of the present invention, which will be described subsequently in greater detail, is to provide a new and improved remote control cooking apparatus with stackable cookers and method which has all the advantages of the prior art and none of the disadvantages.

To attain this, the present invention essentially comprises in combination, a kettle shaped base. The base has a top edge, a bottom, and an outer wall and an inner wall therebetween. The base has three support legs extending from the bottom along the outer wall. Included is a heating element positioned between the outer wall and the inner wall. An L-shaped electrical conductor prong is included the L-shaped electrical conductor prong has an L-top prong and an L-bottom prong. The L-top is adjacent the inner wall and extends upwardly. The L-bottom extends from the inner wall to a position slightly beyond the outer wall and adjacent the top edge. The L-shaped electrical conductor prong is in communication with the heating element. A rheostat timer is provided. The rheostat timer has a cord extending therefrom and a female receptacle therein and opposite the cord. The female receptacle is capable of receiving the L-bottom prong of the L-shaped electrical conductor prong of the base. Also, a top cylindrical cooker is included. The top cylindrical cooker has an upper edge and a side wall with an upper cooking plate therebetween. The side wall has an inner surface and an outer surface. The upper cooking plate is spaced from the upper edge and extends slightly beyond the side wall. The upper cooking plate has a heating element contained therein. The top cooker has a top rheostat with a rectangular housing unit positioned along the inner surface of the side wall. The top rheostat is in communication with the heating element of the upper cooking plate. The housing unit has a female receptacle and a knob. The knob controls current to the heating element of the upper cooking plate. Included is a dome shaped cover. The cover has an outer surface with a handle along an upper portion of the outer surface. The dome cover is seated onto the top cooker. Three cylindrical cookers are provided. Each cooker has a top edge and a side wall with a cooking plate therebetween. The side wall has an inner surface and an outer surface. Each cooking plate is spaced from the top edge and extends slightly beyond the side wall. Each cooking plate has a heating element contained therein. Each cooker has positioned along the inner surface of the side wall a rheostat. The rheostat has a rectangular housing unit. Each rheostat is in communication with the heating element of each cooking plate and an adjustable knob. Each housing unit has male prongs that extend upwardly therefrom and a female receptacle at an end opposite the male prongs. Each of the three cookers are seated one on top of another of the three cookers. The male prongs of one of the cookers couple with the female receptacle of another of the cookers. Any one of the cookers is capable of being seated on the base. When the cooker is seated on the base the female receptacle couples the L-top prong of the base, while the top cylindrical cooker with the cover is seated on any one of the cookers to form a stacked cooking apparatus. Lastly a decoder device is included. The decoder device is attached to the rheostat timer and is capable of receiving a coded signal from a transmitter. The transmitter is in communication with a telephone. The coded signals received by the decoder device activate the rheostat timer of the base which in-turn allows current to flow to the top rheostat and each rheostat of the three cylindrical cookers. Each heating element is then activated by current flow and will cook food positioned in the base, on the top cylindrical cooker and on the three cylindrical cookers.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved remote control cooking apparatus with stackable cookers which has all of the advantages of the prior art remote control appliances and none of the disadvantages.

It is another object of the present invention to provide a new and improved remote control cooking apparatus with stackable cookers which may be easily and efficiently manufactured and marketed.

It is further object of the present invention to provide a new and improved remote control cooking apparatus with stackable cookers which is of durable and reliable constructions.

An even further object of the present invention is to provide a new and improved remote control cooking apparatus with stackable cookers which is susceptible of a low cost of manufacture with regard to both materials and labor, and which accordingly is then susceptible of low prices of sale to the consuming public, thereby making such remote control cooking apparatus with stackable cookers economically available to the buying public.

Still yet another object of the present invention is to provide a new and improved remote control cooking apparatus with stackable cookers which provides in the apparatuses and methods of the prior art some of the advantages thereof, while simultaneously overcoming some of the disadvantages normally associated therewith.

Even still another object of the present invention is to provide a remote control cooking apparatus with stackable cookers for cooking a variety of foods in the apparatus at a set temperature with the apparatus being activated by a signal transmitted through the users telephone to a receiver on the apparatus.

Lastly, it is an object of the present invention to provide a new and improved a remote control cooking apparatus with stackable cookers that includes a kettle shaped base. The base has an outer wall, an inner wall and is supported by three support legs extending therefrom. Included is a heating element positioned between the outer wall and the inner wall. An L-shaped electrical conductor prong is provided. The L-shaped electrical conductor prong is in communication with the heating element and has a L-top prong and a L-bottom prong. A rheostat timer is included. The rheostat timer has a female receptacle capable of receiving therein the L-bottom prong of the L-shaped electrical conductor prong of the base. Also included, is a top cylindrical cooker. The top cooker has an upper edge and a side wall with an upper cooking plate therebetween. The upper cooking plate has a heating element contained therein. The top cooker has a top rheostat with a housing unit. The top rheostat is in communication with the heating element. A dome shaped cover for placement onto the top cooker is provided. Lastly, three cylindrical cookers are included. Each cooker has a top edge and a side wall with a cooking plate therebetween. Each cooker has a rheostat with male prongs and a female receptacle. Each cooking plate has a heating element contained therein and is in communication with each rheostat. Each of the three cookers is capable of sitting one on top of another of the three cookers. Any one of the cookers is seated on the base, while any one of the cookers has the top cylindrical cooker, with the cover, seated thereon to form a stacked cooking apparatus.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
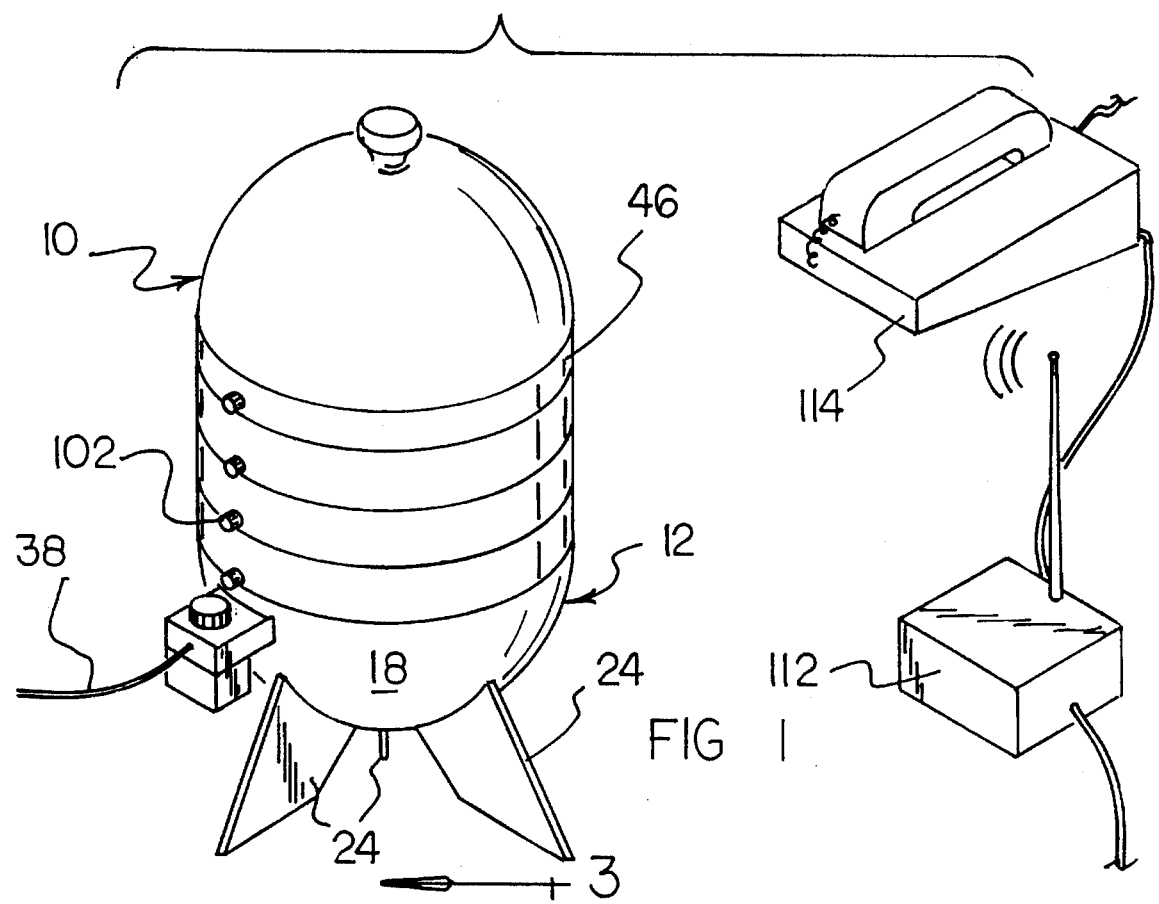
FIG. 1 is a perspective view of the preferred embodiment of the remote control cooking apparatus with stackable cookers constructed in accordance with the principles of the present invention.

With reference now to the drawings, and in particular to FIG. 1 thereof, the preferred embodiment of the new and improved remote control cooking apparatus with stackable cookers embodying the principles and concepts of the present invention and generally designated by the reference numeral 10 will be described.

The present invention, the remote control cooking apparatus with stackable cookers 10 is comprised of a plurality of components. Such components in their broadest context include a base, cookers, a cover, rheostats, a transmitter and a receiver. Such components are individually configured and correlated with respect to each other so as to attain the desired objective.

Figure 3:
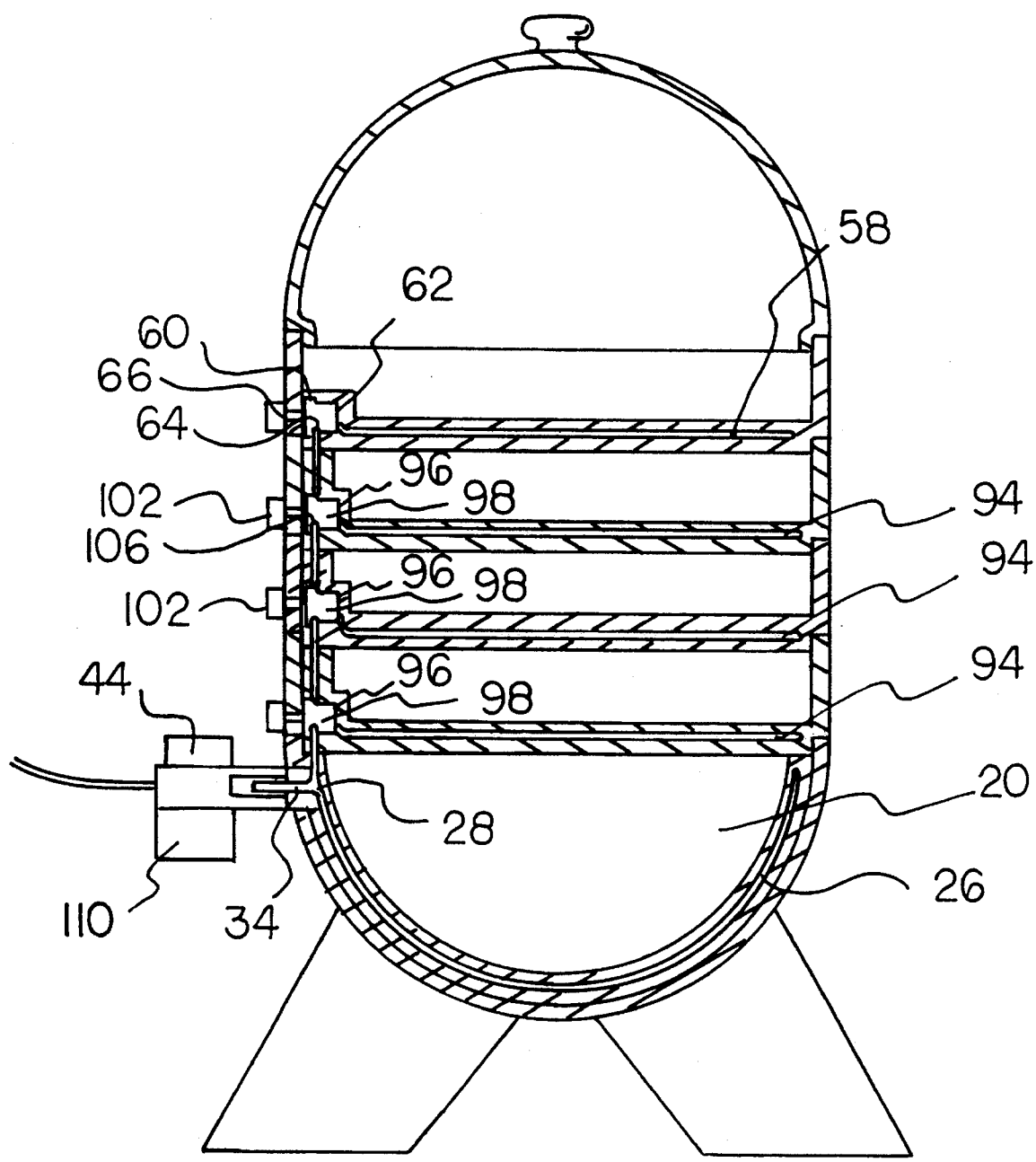
FIG. 3 is a cross-sectional view of the preferred embodiment of the present invention along line 3—3 of FIG. 2.

Specifically, the present invention includes a kettle shaped base 12 as shown FIG. 1. The base has a top edge 14, a bottom 16, and an outer wall 18 and an inner wall 20 therebetween. The top edge of the base has a diameter of about 10 inches. The outer wall is made of metal. The inner wall is made of metal or ceramic. The present invention depicts the inner wall as metal. The base has three support legs 24 that extend from the bottom 16 along the outer wall 18. The support leges are generally rectangular in shape and are formed of a heat resistant rigid plastic. A heating element 26, as shown in FIG. 3 is included between the outer wall and the inner wall. An L-shaped electrical conductor prong 28 is provided. The L-shaped electrical conductor prong has an L-top prong 32 and an L-bottom prong 34. The L-top is positioned adjacent to the inner wall and extends upwardly. The L-bottom extends from the inner wall 20 to a position slightly beyond the outer wall 18 and adjacent the top edge 14. The L-shaped electrical conductor prong is in communication with the heating element of the base.

Figure 2:
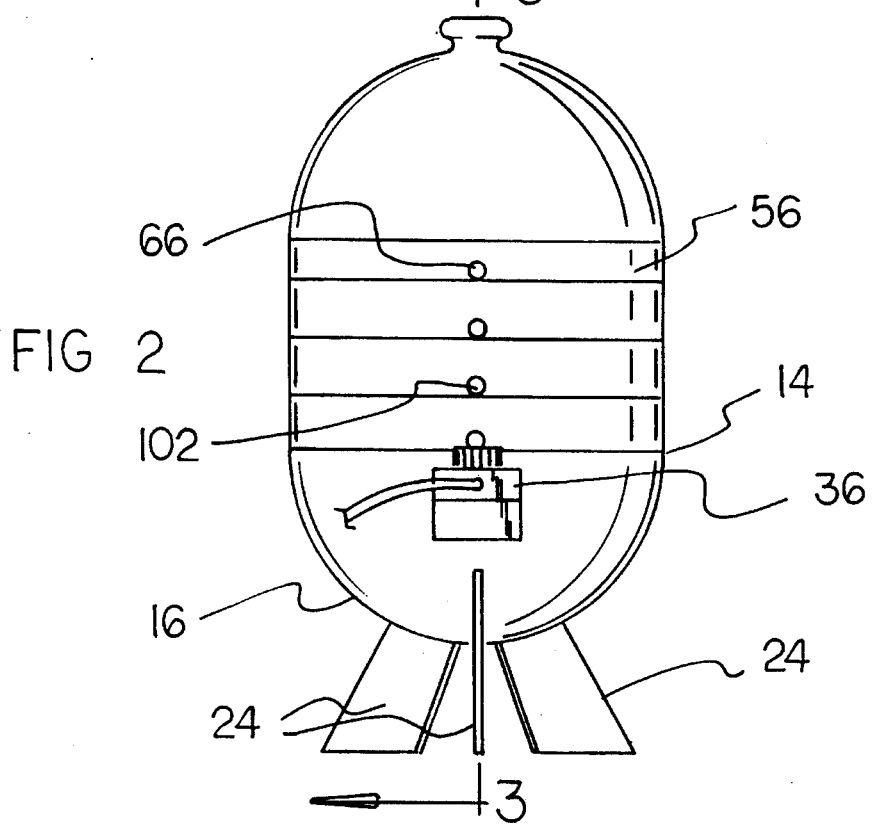
FIG. 2 is a side view of the preferred embodiment of the present invention.

A rheostat timer 36 is provided. The timer, as shown in FIG. 2, has a cord 38 that extends therefrom. The cord may be plugged into a household A/C socket. The timer has a female receptacle 42 therein and opposite the cord. The female receptacle is capable of receiving the L-bottom prong 34 of the L-shaped electrical conductor prong 28 of the base 12. The rheostat timer has a temperature adjustment knob 44.

Figure 4:
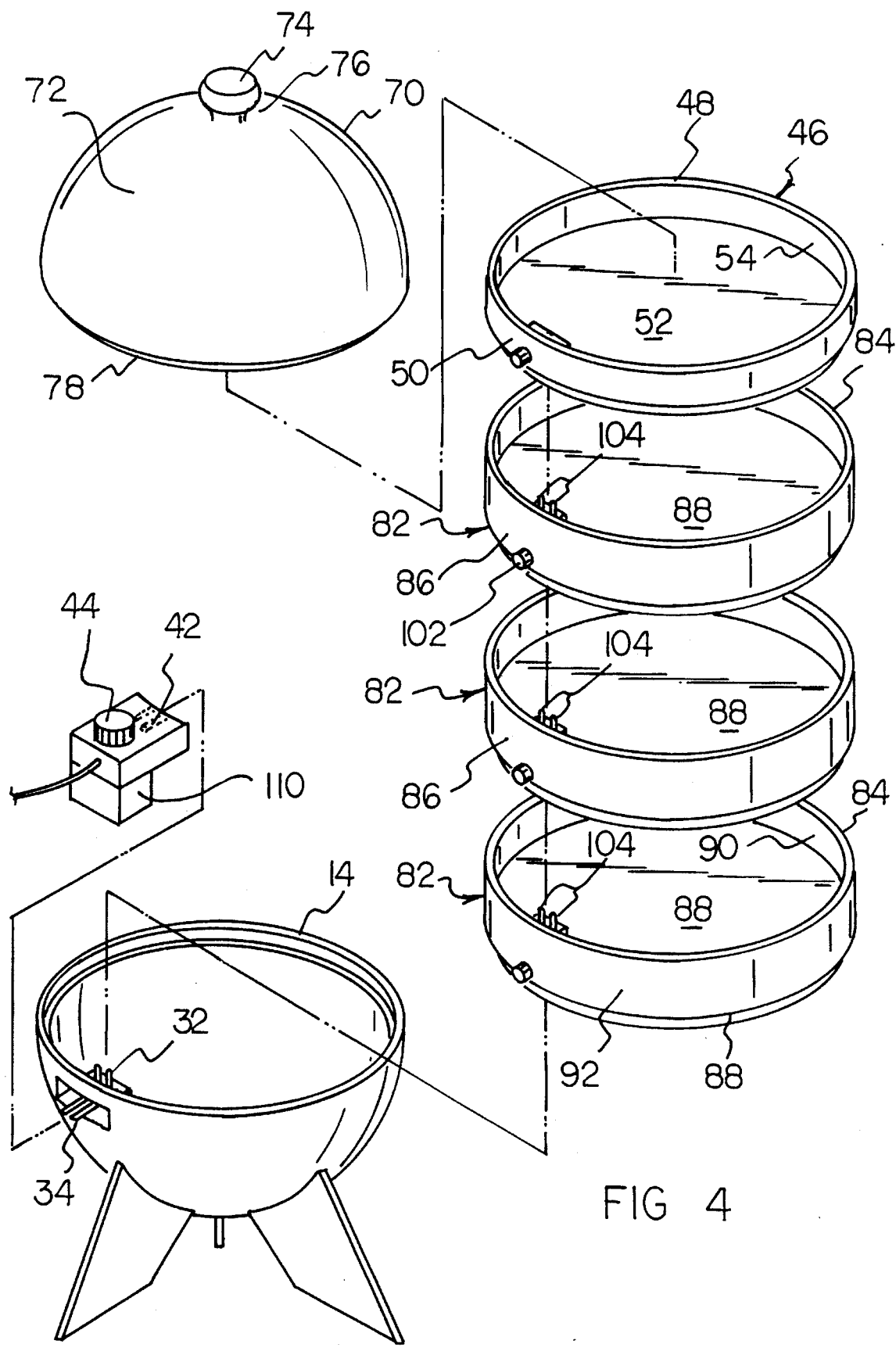
FIG. 4 is an elevational view of the operable components of the present invention. The same reference numerals refer to the same parts through the various Figures.

Also, a top cylindrical cooker 46 is included. The top cooker, as shown in FIG. 4, is formed of metal. The top cooker has an upper edge 48 and a side wall 50 with an upper cooking plate 52 therebetween. The side wall has an inner surface 54 and an outer surface 56. The side wall has an outer diameter of about 10 inches. The upper cooking plate is spaced from the upper edge and extends slightly beyond the side wall. The upper cooking plate has a heating element 58 contained therein. The top cooker has a top rheostat positioned 60 along the inner surface of the side wall. The top rheostat has a rectangular housing unit 62. The top rheostat is in communication with the heating element of the upper cooking plate. The housing unit has a female receptacle 64 and a knob 66 for control of current to the heating element of the upper cooking plate. By controlling the current to the heating element, the temperature of the cooker is controlled. The knob extends from the rheostat to a position along the outer wall of the top cooker.

A dome shaped cover 70 is provided. The cover has an outer surface 72 with a handle 74 along an upper portion 76 of the outer surface. The cover is formed of metal with the handle being formed of a rigid plastic. The dome cover has a bottom edge 78 that allows for snug placement onto the top cooker 46, as shown in FIG. 3.

As best illustrated in FIG. 4, three cylindrical cookers 82 are included. Each cooker has a top edge 84 and a side wall 86 with a cooking plate 88 therebetween. Each cooker is formed of metal and has an exterior diameter of 10 inches. The side wall of each cooker has an inner surface 90 and an outer surface 92. Each cooking plate is spaced from the top edge and extends slightly beyond the side wall. Each cooking plate is formed of metal. Each cooking plate has a heating element 94 contained therein. Each cooker has a rheostat 96 positioned along the inner surface of the side wall.

Each rheostat, as shown in FIG. 3, has a rectangular housing unit 98. Each rheostat is in communication with the heating element of each cooking plate. Each rheostat has an adjustable knob 102 that extends from the rheostat to a position along the outer surface of the side wall. The knob allows adjustment of the temperature of the heating element. Each housing unit has male prongs 104 that extend upwardly therefrom. Each housing unit has a female receptacle 106 at an end opposite the male prongs. Each of the three cookers is capable of sitting one on top of another of the three cookers, as shown in FIG. 2. The male prongs of one of the cookers couple with the female receptacle of another of the cookers when the cookers are seated one on top of another. Any one of the cookers is capable of sitting on the base 12 with the female receptacle 106 coupling the L-top prong 32 of the base. Any one of the cookers is capable of having the top cylindrical cooker with the cover seated thereon. The top cooker and cover seated on the three cooker seated on the base form a stacked cooking apparatus having a height of about 1 foot.

Furthermore, a decoder device 110 is included. The decoder device is attached to the rheostat timer. The decoder device is capable of receiving a coded signal from a transmitter 112 that is in communication with a telephone 114, as illustrated in FIG. 1. The user calls into their home telephone and punches in a code. The code is received by the transmitter. The transmitter sends a radio signal to the decoder device. The coded signals received by the decoder device activates the rheostat timer of the base which in-turn allows current to flow to the top rheostat and each rheostat of the three cylindrical cookers. Each heating element 58 and 94 being activated by current flow will cook food positioned in the base, on the top cylindrical cooker and on the three cylindrical cookers. The remote control cooking apparatus with stackable cookers when activated will operate for forty-five minutes.

The present invention provides an easy to use remote control cooking apparatus with stackable cookers. The present invention has a kettle shaped base that is supported above a receiving surface by three support legs. The present invention has four cookers. Each cooker and the base have rheostats that plug into each other when the cookers are stacked on the base. Food may be placed in the base and on the cookers before the user leaves home. The user may call into his home telephone from any location and punch in a code. The code is passed from the telephone to a transmitter that is plugged into the telephone. The transmitter sends a radio signal to the decoder device attached to the rheostat timer. The signal will cause the activation of the timer which in turn activates the cookers. The food will cook for forty-five minutes at the temperature preset by the user. The cooking apparatus may be formed with the cover, the top cooker, the base and fixed 150 watt warmers in place of the three cookers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A remote control cooking apparatus with stackable cookers for cooking food comprising in combination:

a kettle shaped base having a top edge, a bottom, and an outer wall and an inner wall therebetween, the base having three support legs extending from the bottom along the outer wall, a heating element positioned between the outer wall and the inner wall, an L-shaped electrical conductor prong having an L-top prong and an L-bottom prong, the L-top positioned adjacent the inner wall and extending upwardly, the L-bottom extending from the inner wall to a position slightly beyond the outer wall and adjacent the top edge, the L-shaped electrical conductor prong being in communication with the heating element;

a rheostat timer having a cord extending therefrom and a female receptacle therein and opposite the cord, the female receptacle capable of receiving therein the L-bottom prong of the L-shaped electrical conductor prong of the base;

a top cylindrical cooker having an upper edge and a side wall with an upper cooking plate therebetween, the side wall having an inner surface and an outer surface, the upper cooking plate being spaced from the upper edge and extending slightly beyond the side wall, the upper cooking plate having a heating element contained therein, the top cooker having positioned along the inner surface of the side wall a top rheostat with a rectangular housing unit, the rheostat being in communication with the heating element of the upper cooking plate, the housing unit having a female receptacle and a knob for control of current to the heating element of the upper cooking plate;

a dome shaped cover having an outer surface with a handle along an upper portion of the outer surface, the dome cover capable of being seated onto the top cooker;

three cylindrical cookers with each cooker having a top edge and a side wall with a cooking plate therebetween, the side wall having an inner surface and an outer surface, each cooking plate being spaced from the top edge and extending slightly beyond the side wall, each cooking plate having a heating element contained therein, each cooker having positioned along the inner surface of the side wall a rheostat with a rectangular housing unit, each rheostat being in communication with the heating element of each cooking plate and an adjustable knob, each housing unit having male prongs extending upwardly therefrom and a female receptacle at an end opposite the male prongs, each of the three cookers being capable of being seated one on top of another of the three cookers with the male prongs of one of the cookers coupling with the female receptacle of another of the cookers, any one of the cookers capable of being seated on the base having the female receptacle coupling the L-top prong of the base, while any one of the cookers being capable of having seated thereon the top cylindrical cooker with the cover thereon to form a stacked cooking apparatus; and a decoder device being attached to the rheostat timer capable of receiving a coded signal from a transmitter in communication with a telephone, the coded signals received by the decoder device activate the rheostat timer of the base which in-turn allows current to flow to the top rheostat and each rheostat of the three cylindrical cookers, each heating element being activated by current flow will cook food positioned in the base, on the top cylindrical cooker and on the three cylindrical cookers.

2. A remote control cooking apparatus with stackable cookers comprising:

a kettle shaped base having an outer wall, an inner wall and being supported by three support legs extending therefrom, a heating element positioned between the outer wall and the inner wall, an L-shaped electrical conductor prong being in communication with the heating element and having a L-top prong and a L-bottom prong;

a rheostat timer having and a female receptacle capable of receiving therein the L-bottom prong of the L-shaped electrical conductor prong of the base;

a top cylindrical cooker having an upper edge and a side wall with an upper cooking plate therebetween, the upper cooking plate having a heating element contained therein, the top cooker having a top rheostat being in communication with the heating element and having a housing unit, a dome shaped cover capable of being seated onto the top cooker; and three cylindrical cookers with each cooker having a top edge and a side wall with a cooking plate therebetween, each cooker having a rheostat with male prongs and a female receptacle, each cooking plate having a heating element contained therein and being in communication with each rheostat, each of the three cookers being capable of being seated one on top of another of the three cookers, any one of the cookers capable of being seated on the base, while any one of the cookers being capable of having seated thereon the top cylindrical cooker with the cover thereon to form a stacked cooking apparatus.

3. The remote control cooking apparatus with stackable cookers as set forth in claim 2 wherein the support legs are proportionately spaced.

4. The remote control cooking apparatus with stackable cookers as set forth in claim 2 wherein the base has a top edge and a bottom edge and the L-bottom extends from the inner wall to a position slightly beyond the outer wall and adjacent the top edge.

5. The remote control cooking apparatus with stackable cookers as set forth in claim 2 wherein the rheostat timer having a cord extending therefrom for passing current to the rheostat timer.

6. The remote control cooking apparatus with stackable cookers as set forth in claim 2 wherein the housing unit of the top rheostat being rectangular and having a female receptacle and a knob for control of current to the heating element of the upper cooking plate.

7. The remote control cooking apparatus with stackable cookers as set forth in claim 2 wherein the dome cover having a handle.

8. The remote control cooking apparatus with stackable cookers as set forth in claim 2 wherein the rheostat having a rectangular housing unit with the male prongs extending upwardly therefrom and the female receptacle at an end opposite the male prongs, and the male prongs of one of the cookers coupling with the female receptacle of another of the cookers when each of the cookers are seated one on top of another.

9. The remote control cooking apparatus with stackable cookers as set forth in claim 2 wherein a decoder device being attached to the rheostat timer and capable of receiving a coded signal from a transmitter in communication with a telephone to activate the rheostat timer of the base which in-turn allows current to flow to the top rheostat and each rheostat of the three cylindrical cookers when in a stacked position to cook food positioned in the base, on the top cylindrical cooker and on the three cylindrical cookers.

* * * * *